A. M. RONTEY.
Combined Hand and Stand Mirrors.
No. 153,983. Patented Aug. 11, 1874.
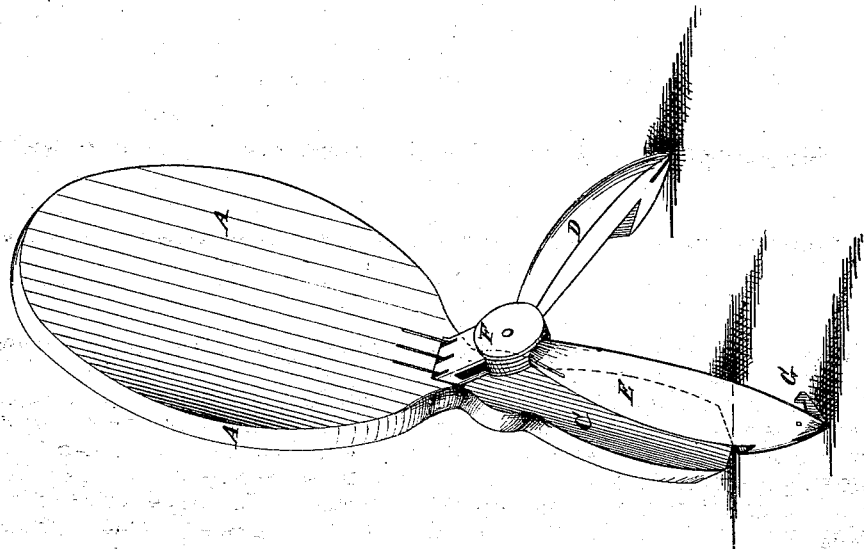
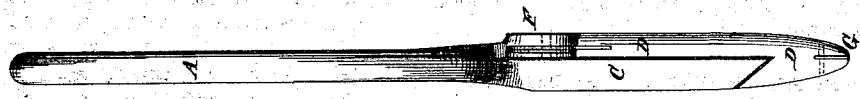
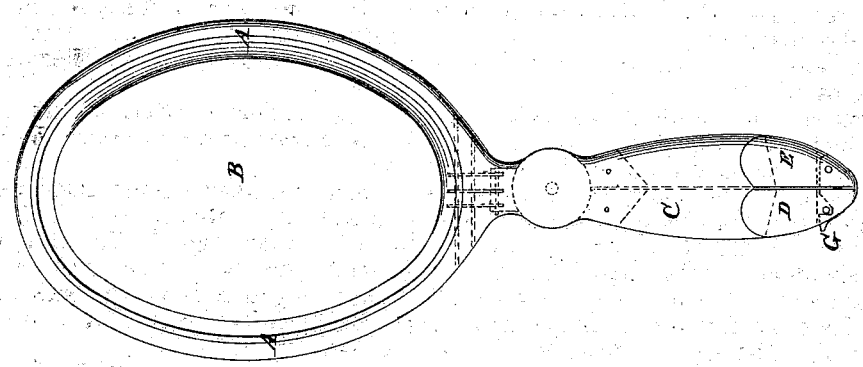
WITNESSES:
INVENTOR:
BY
ATTORNEYS.

UNITED STATES PATENT OFFICE.

ABEL M. RONTEY, OF NEW YORK, N. Y.

IMPROVEMENT IN COMBINED HAND AND STAND MIRRORS.

Specification forming part of Letters Patent No. 153,983, dated August 11, 1874; application filed May 16, 1874.

*To all whom it may concern:*

Be it known that I, ABEL M. RONTEY, of the city, county, and State of New York, have invented a new and useful Improvement in Combined Hand and Stand Mirrors, of which the following is a specification:

Figure 1 is a front view of a hand-mirror, illustrating my invention. Fig. 2 is an edge view of the same. Fig. 3 is a rear perspective view of the same.

My invention has for its object to furnish hand-mirrors which shall be so constructed that they may also be used as stand-mirrors for shaving and other purposes, and which, when used as hand-mirrors, shall be as neat and convenient as though they had no other use.

The invention consists in the handle of a hand-mirror, made in three or more parts, hinged, all or part, at their upper ends, to adapt them to be opened out to serve as a stand for the mirror, and in the double hinge, in combination with the parts of the handle and with the frame of a hand-mirror, as hereinafter fully described.

Similar letters of reference indicate corresponding parts.

A represents the frame or case of the mirror, in which the reflector B is set in the ordinary way. The handle of the mirror is made in three parts, C D E. The forward part, C, is made rigid with the frame A, and its lower end has two bevels formed upon it to fit into beveled shoulders formed upon the forward side of the lower ends of the two parts D E, so as to draw the three parts snugly together when closed. The upper ends of the two rear parts D E of the handle are hinged to each other by a hinge, F, so that their lower ends may be spread apart. The lower part of the hinge F is made similar to a rule-hinge. The upper part of the hinge is hinged to the frame A, so that the lower ends of the parts D E may be swung back. The upper joint of the double hinge F may be formed by slotting the end of an arm or plate formed upon the lower part to receive two or more strips of metal, which are let into the back of the mirror edgewise and secured by pins. The hinge F should be so formed as to appear to be an ornamentation of the handle.

Instead of making one part of the handle rigid with the frame A, the said handle may have a bow attached to it, which embraces the lower part of the frame A, and to the ends of which the said frame A is pivoted, so that the reflector may be set at any desired inclination. In this case the handle may be made in three or four parts, the upper ends of which are hinged to the said bow in such a way that their lower end may move out radially from the axis of said handle. In this case, also, the bow should be so formed as to have the appearance of a molding.

The lower end of the parts of the handle should be provided with a latch, G, or other suitable fastening, to keep them in place when closed.

Having thus described my invention, I claim as new and desire to secure by Letters Patent—

A mirror-handle constructed as described, consisting of the parts C D E, the first of which is made rigid to the back, with its end beveled off, as shown, and the other two hinged together and to the back, and provided with beveled grooves, as and for the purpose specified.

ABEL M. RONTEY.

Witnesses:
JAMES T. GRAHAM,
T. B. MOSHER.